United States Patent [19]

Sarkozy

[11] Patent Number: 4,624,638

[45] Date of Patent: Nov. 25, 1986

[54] CVD BOAT LOADING MECHANISM HAVING A SEPARABLE, LOW PROFILE CANTILEVERED PADDLE ASSEMBLY

[75] Inventor: Robert F. Sarkozy, Westford, Mass.

[73] Assignee: BTU Engineering Corporation, North Billerica, Mass.

[21] Appl. No.: 676,086

[22] Filed: Nov. 29, 1984

[51] Int. Cl.$^4$ .......................... F27D 5/00; A47J 45/00; B65G 25/00

[52] U.S. Cl. .................................... 432/253; 294/31.2; 414/180

[58] Field of Search ................ 432/239, 253; 414/180, 414/181; 294/31.2

[56] References Cited

U.S. PATENT DOCUMENTS

| | | | |
|---|---|---|---|
| 3,604,694 | 9/1971 | Muller | 432/253 |
| 3,737,282 | 6/1973 | Hearn et al. | 432/253 |
| 3,857,598 | 12/1974 | Jelich | 294/31.2 |
| 3,908,845 | 9/1975 | Bolt | 414/910 |
| 4,459,104 | 7/1984 | Wollmann | 432/239 |
| 4,468,195 | 8/1984 | Sasaki et al. | 432/239 |
| 4,516,897 | 5/1985 | Snider et al. | 414/180 |
| 4,518,349 | 5/1985 | Tressler et al. | 432/239 |

*Primary Examiner*—John J. Camby
*Attorney, Agent, or Firm*—Weingarten, Schurgin, Gagnebin & Hayes

[57] ABSTRACT

A semi-cylindrical low-profile cantilevered paddle of refractory material is separably clamped to a cantilevered arm fastened to a movable boat-loader. A clamping mechanism is disclosed that preferably includes spaced brackets fastened to the arm defining retaining loops for slidably receiving the paddle. A flexible, stress-relief saddle portion is provided on one of the brackets. The rugged and breakage-resistant semi-cylindrical paddle is inexpensive to procure and replace, and its low profile makes it possible to adapt existing CVD furnaces for operation with larger semiconductor wafers.

12 Claims, 7 Drawing Figures

CVD BOAT LOADING MECHANISM HAVING A SEPARABLE, LOW PROFILE CANTILEVERED PADDLE ASSEMBLY

FIELD OF THE INVENTION

This invention is directed to the field of chemical vapor deposition diffusion furnaces, and more particularly, to a boat loading mechanism therefor having a low-profile, disengageable, two-stage cantilevered paddle assembly.

BACKGROUND OF THE INVENTION

Chemical vapor deposition (CVD) diffusion furnaces are operative to deposit intended thin film on semiconductor wafers during the various phases of the integrated circuit fabrication processes. The wafers to be processed are typically loaded in a quartz support structure commonly called a boat. A boat loader coupled to the furnace is operative to insert the plurality of semiconductor wafers into the furnace for CVD processing and to remove them from the furnace after intended thin film formation thereon.

Boat loaders for CVD furnaces are called upon to be rugged in construction; to be free from undesirable particulate generation that may contaminate and alter the electrical properties of the semiconductor wafers; to be readily removably replaceable without requiring significant effort or furnace down-time; and to have physical dimensions that minimize usage of intrafurnace reaction chamber real estate. The heretofore known boat loaders are deficient in one or more of these and other aspects.

SUMMARY OF THE INVENTION

A boat loader for a CVD diffusion furnace according to the present invention includes a cantilevered support member having a free end. A furnace door is mounted in gas-tight sealing relation on the support member at a point therealong in spaced relation to its free end. A clamp assembly is fastened to the free end of the suport member for removably retaining a low-profile boat-support paddle that, in presently preferred embodiment, includes an elongated semicylindrical section of quartz or other refractory substance. The clamp assembly for the semi-cylindrical quartz paddle includes a first inflexible semi-cylindrical bracket member fastened to the support member adjacent the point where the door is supported, and a second flexible semi-cylindrical bracket member fastened at a point adjacent the free end of the support member. The semi-cylindrical quartz paddle is readily removably slidably insertable in and supported by the confronting surfaces of the first and second bracket members with one of its ends abutting the door and with its other end freely extending in cantilevered fashion.

The semi-cylindrical cantilevered paddle has an extremely low-profile that makes it possible to process the largest diameter wafers for a given CVD furnace cross-sectional dimension. Existing furnace types operable with the 100 mm wafer sizes that are common today can thereby be readily adapted for operation with the newer 125 mm and 150 mm wafer sizes. Chemical vapor deposition processing of larger wafer sizes is thereby accomplished without necessitating an acquisition of a CVD diffusion furnace having a larger cross-sectional dimension which results in considerable cost savings.

The semi-cylindrical paddle alone, and in combination with the clamping assembly for removably retaining the paddle in cantilevered fashion, provides a rugged construction that substantially eliminates the possibility of component and assembly breakage as well as undesirable wafer contamination during CVD processing. The semi-cylindrical boat-support paddle is readily slidably removable from its clamping assembly and replaced by a cleaned or a new paddle in a manner neither requiring further system disconnection, significant system down-time, nor lost system processing throughput. The semi-cylindrical quartz paddle is such that it is readily fabricated at a quite modest cost and it can be easily cleaned by a simple wiping action.

BRIEF DESCRIPTION OF THE DRAWINGS

These and other features and advantages of the present invention will become apparent as the invention becomes better understood by referring to the following solely exemplary and non-limiting detailed description of a preferred embodiment thereof, and to the drawings, wherein.

DETAILED DESCRIPTION OF THE PREFERRED EMBODIMENT

Figure 1:
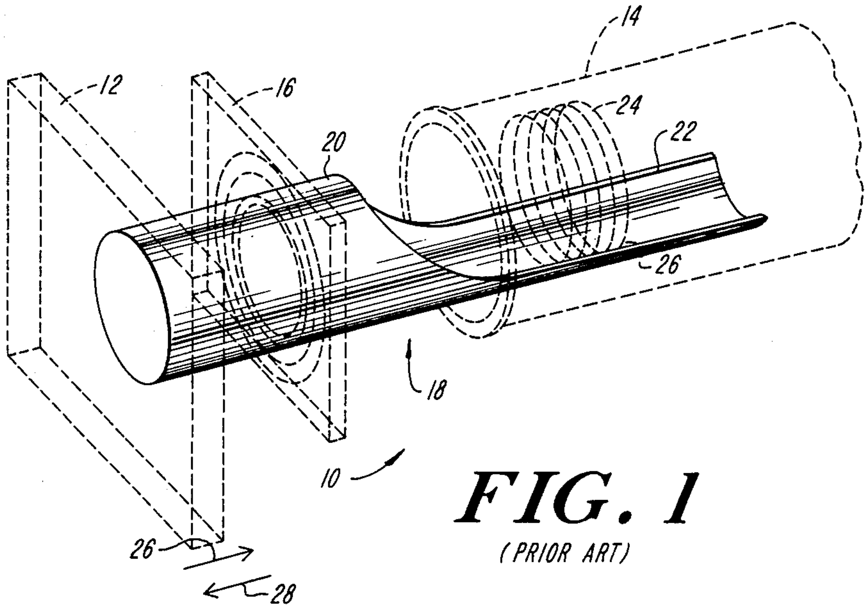
FIG. 1 (PRIOR ART)
FIG. 1 is a partially schematic and fragmentary isometric view illustrating a prior art boat loading mechanism for a CVD diffusion furnace.

Referring now to FIG. 1, generally designated at 10 is a partially schematic and fragmentary isometric view illustrating a prior art boat loading mechanism for a chemical vapor deposition (CVD) diffusion furnace. The system 10 includes an actuator schematically illustrated by a dashed box 12, a diffusion furnace schematically illustrated in dashed outline 14, and a furnace door illustrated by a dashed box 16.

A quartz paddle generally designated 18 is fastened to the actuator 12 in cantilevered fashion. The paddle 18 includes a 360° cylindrical portion 20 that tapers to, for example, a semi-cylindrical 120° portion 22. The door 16 is mounted to the fully cylindrical portion 20 of the paddle 18 in gas-tight sealing relation.

A plurality of wafers illustrated dashed at 24 are removably mounted in a boat schematically illustrated at 26 and are supported on the semi-cylindrical portion 22 of the paddle 18. The actuator 12 is operable in well-known manner to impart a motion indicated by an arrow 26 to the paddle 18 for inserting the wafers 24 into the furnace 14, and is operable to impart a motion indicated by an arrow 28 to the paddle 18 to remove the wafers out of the CVD furnace after intended thin film formation thereon.

The paddle 18 is comparatively expensive to fabricate. It typically is produced by manually cutting a 360° quartz cylinder to remove, for example, 240° of its arc to produce the 120° boat-support portion 22. Paddle production is materials intensive and costly insofar as the major portion of the starting cylinder is not usable and must be thrown-away after cutting. The resulting paddle 18, moreover, is comparatively delicate. It often breaks both during routine handling and as a result of thermally induced strain during its operation. In addition, when the paddle 18 needs to be replaced, the paddle 18 must be disconnected from both the actuator 12 and the door 16 in a manner involving considerable time and labor costs as well as significant system down-time with consequent lost system throughput.

Figure 2:
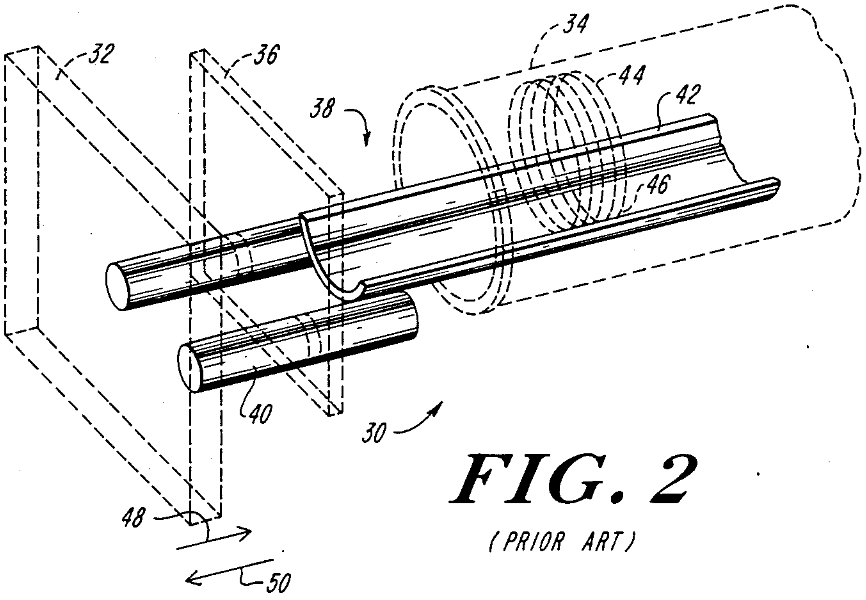
FIG. 2 (PRIOR ART)
FIG. 2 is a partially schematic and fragmentary isometric view illustrating another prior art boat loading mechanism for a CVD diffusion furnace.

Referring now to FIG. 2, generally designated at 30 is a partially schematic and fragmentary isometric view illustrating another prior art boat loading mechanism for a CVD diffusion furnace. The system 30 includes an actuator illustrated by a dashed box 32, a CVD diffusion furnace illustrated in dashed outline 34, and a furnace door illustrated dashed at 36.

A cantilevered paddle assembly generally designated 38 that includes two longitudinally extending cantilevered support rods 40 is fastened to the actuator 32. A semi-cylindrical refractory paddle 42 is permanently fastened to the ends of the rods 40 as by tack welds or any other suitable means.

A plurality of semiconductor wafers illustrated dashed at 44 are mounted in a conventional boat schematically illustrated at 46 and removably positioned on the semi-cylindrical paddle 42. The actuator 32 is operative to impart motion to the paddle 38 as indicated by an arrow 48 for loading the wafers 44 into the furnace 34, and is operative to impart motion to the paddle 38 as indicated by an arrow 50 for unloading the wafers 44 therefrom after CVD processing. The door 36 is sealed to the cantilevered rods 40 and, as will readily be appreciated by those skilled in the art, moves with the rods in such a way that when the actuator is loading the wafers it also brings the door 36 into sealing relation with the mouth of the furnace 34, and conversely.

With each batch of wafers processed in the CVD furnace, the paddle 38 is heated and cooled successively. The change in temperature stresses the tack welds, the rods 40, and the shell 42. The resulting mechanical strain in the paddle 38 is such that both transverse and longitudinal cracks develop therealong, often leading to the breakage of the assembly not only in use, contaminating the wafers, but also during routine handling. Furthermore, after breakage, or for routine maintenance, the paddle must be dismantled from the door assembly as well as from the actuator to effect its removal and replacement in a manner requiring considerable labor, time, material, and lost system throughput costs. The paddle assembly 38 is also comparatively delicate to handle, often breaking during fabrication, installation, and during routine handling.

Figure 3A:
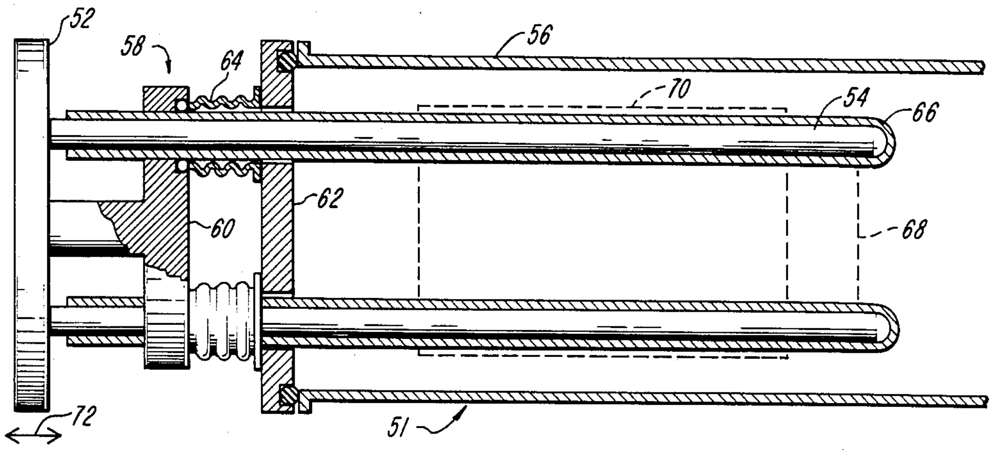
FIG. 3A (PRIOR ART)
FIG. 3A is partially schematic and fragmentary horizontal sectional view of a further prior art boat loading mechanism for a CVD diffusion furnace.

Another prior art boat loading mechanism for a CVD diffusion furnace is illustrated generally at 51 in FIG. 3A. The system 51 includes an actuator 52, a pair of spaced cantilevered support rods 54 fastened to the actuator 52 that individually extend into the reaction chamber of a diffusion furnace 56, and a door assembly generally designated 58 mounted to the cantilevered rods 54 in gas-tight sealing engagement.

The door assembly 58 includes a support plate 60 fastened to the actuator 52. A furnace door 62 is resiliently coupled to the plate 60 by bellows-like vacuum fittings 64. The rods 54 pass through both the plate 60 and the furnace door 62 in gas-tight sealing engagement.

A shroud 66 such as a quartz tube having a sealed end is received over each of the rods 54 to prevent the material of the rods 54, typically a refractory material such as alumina ($Al_2O_3$), from contaminating the interior of the diffusion furnace 56 during operation of the furnace. The free ends of the shrouded support arms are tied together as schematically illustrated by a dot/-dashed line 68 to prevent its oscillation.

A semiconductor boat schematically illustrated dashed at 70 is removably supported on the shrouded cantilevered support rods. The actuator 52 controllably moves as indicated by a bi-directional arrow 72 for loading and unloading the batch of wafers into and out of the furnace 56.

Figure 3B:
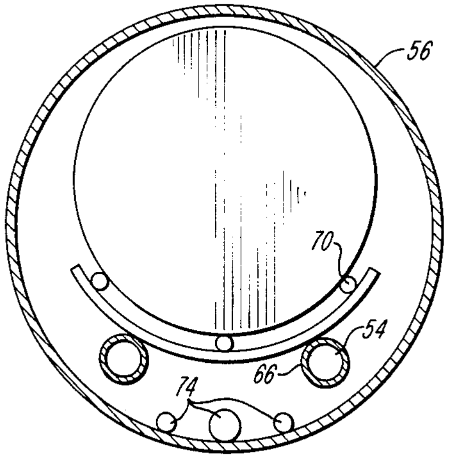
FIG. 3B (PRIOR ART)
FIG. 3B is a vertical sectional view through a CVD diffusion furnace having the prior art boat loading mechanism of FIG. 3A.

As shown in FIG. 3B, the cantilevered support rods 54 and shrouds 66 therefor occupy an undesirably large portion of the usable internal volume of the diffusion furnace 56. Typically, about 60% of the furnace volume is used for deposition, with the remaining 40% being used both for receiving the supporting structures for the boat 70 and for receiving gas injection tubes 74 operative to inject reactant in gas phase into the furnace 56 in well known manner. Another disadvantage of this type of boat loading mechanism is that pin holes or other structural flaws that tend to form in the shrouds 66 act to deplete the pressure conditions inside the diffusion furnace. In addition, paddle assemblies that need to be replaced because of defects or because of routine maintance, as in the other prior art devices discussed above in connection with the description of FIGS. 1 and 2, must be dismantled from the door support assembly and a new or a cleaned paddle subsequently reconnected into the door assembly in a manner involving considerable labor, materials, time, and lost systems throughput costs.

Figure 4:
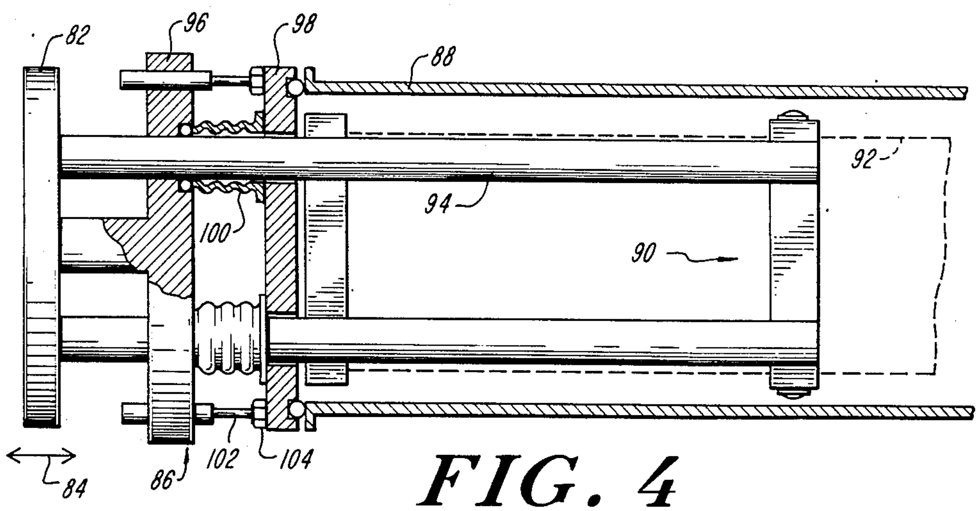
FIG. 4 is a partially schematic and fragmentary horizontal sectional view illustrating the novel CVD boat loading mechanism having a separable low-profile cantilevered paddle assembly according to the present invention.

Referring now to FIG. 4, generally designated at 80 is a partially schematic and fragmentary horizontal sectional view of a novel CVD boat loading mechanism having a separable low-profile cantilevered paddle assembly according to the present invention. The system 80 includes an actuator 82 operable to provide bi-directional movement as illustrated by an arrow 84. A cantilevered support assembly generally designated 86 is fastened to the actuator 82 and has a free end that extends into the vestibule of a CVD diffusion furnace 88. A clamp assembly generally designated 90 to be described is fastened to the free end of the cantilevered support assembly 86 for removably retaining a separable low-profile cantilevered boat support paddle illustrated in dashed outline 92 to be described.

The cantilevered support assembly 86 preferrably includes first and second laterally spaced and longitudinally extending rods 94 fashioned from selected metals such as stainless steel, or from high-strength refractory materials such as silicon carbide. The rods 94 are each fastened to the actuator 82 and have a length selected to allow them to extend therefrom a predetermined distance into the diffusion furnace after the actuator 82 loads a batch of wafers for CVD processing.

A door mounting plate 96 is fastened to the actuator 82 for movement therewith. A furnace door 98 is flexibly mounted in gas-tight sealing engagement to the door mounting plate 96 via resilient vacuum couplings 100 in such a way that the rods 94 pass through both the door 98 and door support plate 96 in gas-tight sealing engagement. The vacuum gaskets 100 provide sufficient resiliance to readily allow for proper sealing alignment of the furance door 98 with the mouth of diffusion furnace. Adjustable posts 102 are provided on the plate 96. The posts 102 have heads 104 confronting the door 98 that may be manually adjusted to selectively abut the furnace door 98 for stabilizing it mechanically.

Figure 5:
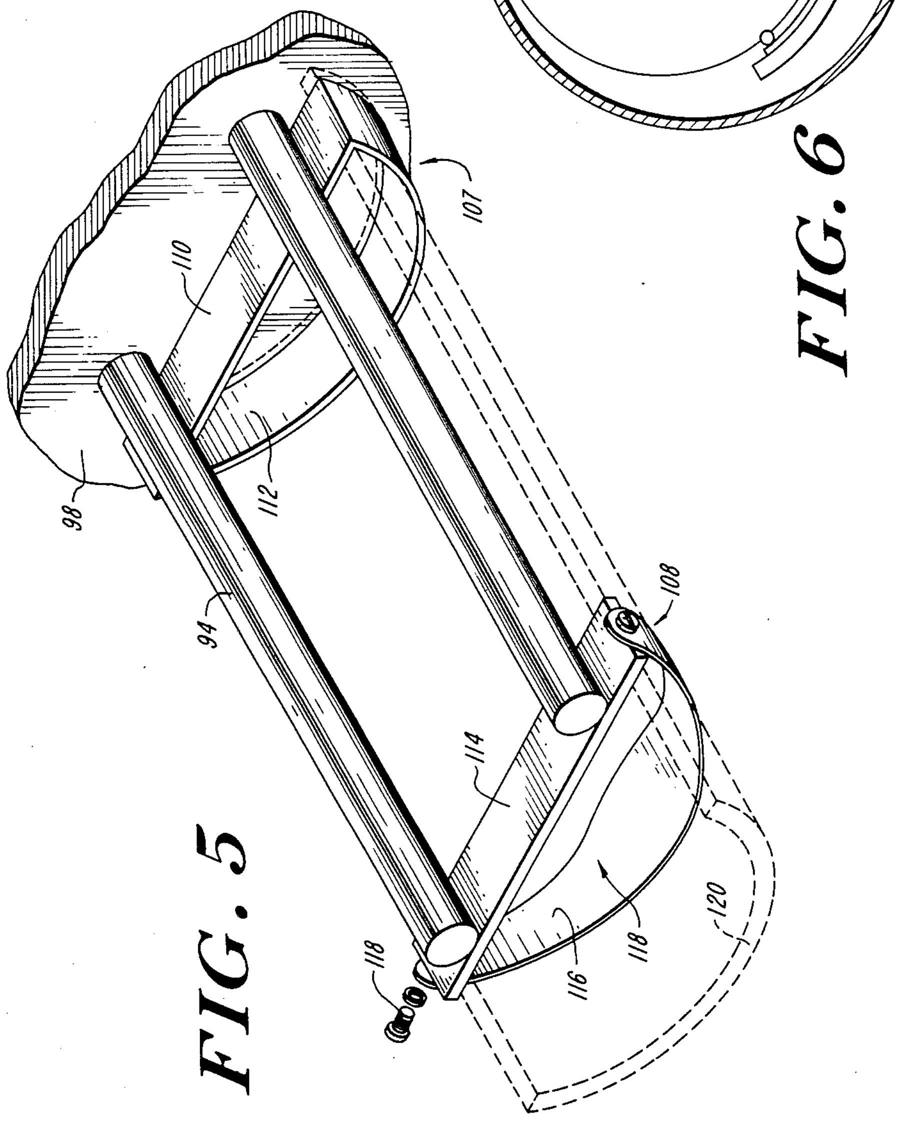
FIG. 5 is an isometric view illustrating the clamping assembly of the CVD boat loading mechanism having a separable low-profile cantilevered paddle assembly acording to the present invention.

Referring now to FIG. 5, generally designated at 106 is a preferred embodiment of a clamping assembly for removably retaining a low-profile cantilevered boat-support paddle according to the present invention. The clamping assembly 106 includes a first bracket generally designated 107 fastened to the rods 94 at a point therealong adjacent the interior wall of the furnace door 98, and a second bracket generally designated 108 fastened to the rods 94 at a point adjacent their free ends.

The bracket 107 preferably includes a metallic ring having a planar portion 110 and an integral depending arcuate portion 112. The bracket 108 includes a planar metallic portion 114 and a depending flexible saddle portion 116 fastened to the ends of the planar portion 114 as by threaded fasteners 118. The saddle 116 may be formed of any suitable flexible material such as a resilient metal and it preferably has a central area generally designated 118 having dimensions generally larger than the dimensions of its end regions to provide stress relief.

A semi-cylindrical paddle shown dashed at 120 that is fashioned of quartz or any other suitable refractory material such as silicon carbide is slidably received through the brackets 107, 108. In the inserted condition, one of its ends both abuts the confronting surface of the flat portion 110 of the bracket 107 and abuts the confronting surface of the furnace door 98 and its other end, not shown, extends in cantilevered fashion into the diffusion furnace. The bottom surface of the paddle 120 confronting the bracket 108 is supported by and rests on the stress-relief portion 118 of the saddle 116.

The separable paddle 120 is readily removably inserted into the clamping assembly 106 provided therefor without necessitating dismantling of the door assembly 86 (FIG. 4). The semi-cylindrical quartz paddle 120 is inexpensive to manufacture. Three such paddles are capable of being economically produced by cutting a single length of a quartz cylinder. The paddle is extremely rugged and breakage resistant and is easily wiped clean.

Figure 6:
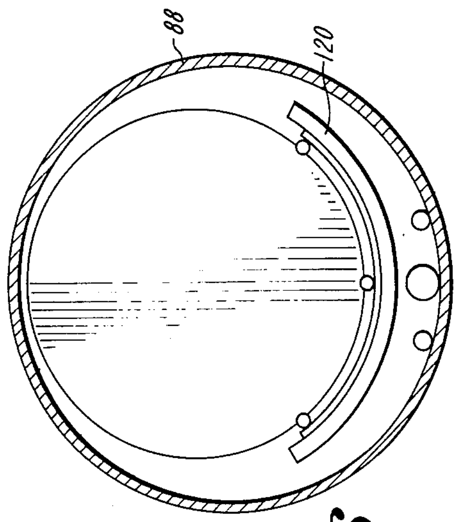
FIG. 6 is a vertical section through a CVD diffusion furnace incorporating the boat loading mechanism having a separable low-profile cantilevered paddle assembly according to the present invention.

As shown in FIG. 6, the two-stage cantilevered paddle support assembly of the present invention has a low-profile that occupies a comparatively small volume of the reaction chamber of a CVD diffusion furnace. As is readily evident by a comparison with FIG. 3B, it thereby is capable of accomodating comparatively larger wafers, and when back fitted on an already existing diffusion furnace, allows for CVD processing of comparatively larger diameter wafers without requiring an expenditure for a new, and larger, CVD furnace.

The paddle of the present invention is replaceable by simply re-inserting a cleaned or a new paddle into the clamping assembly provided therefor, thus eliminating paddle disconnection from the loader or furnace door as in the heretofore known devices. System throughput revenue is thereby considerably enhanced while materials, labor, and time costs are rendered substantially inconsequential. The paddle is a low-cost item to procure and it is quite rugged and breakage-resistant. The absence of tack welds and comparatively complex quartzwork eliminates the possibility of thermal stress induced cracking or other failure.

Many modifications of the presently disclosed invention will become apparent to those skilled in the art having the benefit of the instant invention without departing from the scope of the appended claims.

What is claimed is:

1. A mechanism for loading and removing plural wafers into and out of a chemical vapor deposition diffusion furnace having an entrance vestibule, comprising:

a boat loader;

an enlongated member having ends mounted to said boat loader in cantilevered fashion such that one of said ends defines a supported end and the other of said ends defines a free end;

a furnace door mounted in gas-tight relation to said elongated member at a point thereof adjacent said supported end and remote from said free end;

a paddle for supporting a plurality of wafer loaded boats;

said paddle consisting of a longitudinally extending semi-cylindrical member of a refractory material defining a low-profile when inside the diffusion furnace;

a clamp fastened to said free end of said elongated member for releaseably retaining said paddle to said free end of said elongated support in cantilevered fastion;

said clamp including a first ring-like member, a second ring-like member spaced apart from the first ring-like member along the free end of the elongated member, said first and second ring-like members individually being configured and together being aligned to slidably receive and to support said semi-cylindrical refractory member in cantilevered fashion.

2. The invention of claim 1, wherein said elongated member having a free end includes two generally parallel support rods each having a free end.

3. The invention of claim 2, wherein said support rods are metallic.

4. The invention of claim 3, wherein said metallic support rods have dimensions that allow them to extend only into said vestibule portion of the CVD diffusion furnace.

5. The invention of claim 1, wherein said paddle is a semi-cylindrical section of refractory material.

6. The invention of claim 5, wherein said refractory material is quartz.

7. The invention of claim 6, wherein said quartz section is a third section of a quartz cylinder.

8. The invention of claim 1, wherein one of said rings includes a flexible saddle portion.

9. The invention of claim 8, wherein said flexible saddle portion has ends and includes a central portion of dimensions enlarged with respect to the dimensions of its ends to provide stress-relief.

10. The invention of claim 1, further including means coupled to said elongated member for stabilizing said door.

11. The invention of claim 10, wherein said stabilizing means includes axially adjustable posts.

12. The invention of claim 5, wherein said refractory material is silicon carbide.

* * * * *